United States Patent Office 3,632,589
Patented Jan. 4, 1972

1

3,632,589
DISPERSE DYES OF THE NAPHTHOYLENE-
BENZIMIDAZOLE SERIES
Curt Mueller, Basel, and Ulrich Zirngibl, Binningen, Basel-Land, Switzerland, assignors to Sandoz Ltd. (also known as Sandoz A.G.), Basel, Switzerland
No Drawing. Filed Jan. 11, 1968, Ser. No. 697,004
Claims priority, application Switzerland, Jan. 20, 1967, 875/67
Int. Cl. C07d 49/30
U.S. Cl. 260—282
6 Claims

ABSTRACT OF THE DISCLOSURE

Disperse dyes of the naphthoylene-benzimidazole series, having in their molecular structure a group of the formula

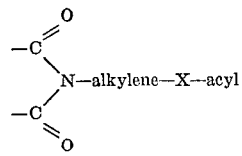

wherein X is an oxygen atom or a tertiary amino group, when used for the coloration of hydrophobic fully synthetic or semi-synthetic fibres, display good fastness to light, wet and temperature treating.

This invention relates to disperse dyes and mixtures of disperse dyes of the formula

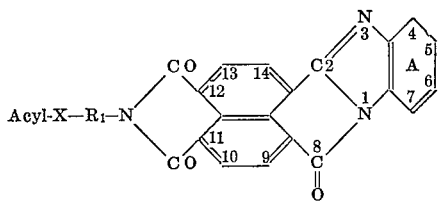

and to a process for the production of these dyes.

In Formula I $R_1$ stands for a divalent aliphatic radical which may be interrupted by an oxygen bridge, X for —O— or —$NR_2$—, "acyl" for a non-water-solubilizing aliphatic or benzene carboxylic acid radical and $R_2$ for lower alkyl radical, which may be substituted by an acetoxy group and in which the nucleus A may bear further non-water-solubilizing substiuents. The divalent aliphatic radical $R_1$ may be branched, unbranched or cyclic aliphatic radical containing in all up to 8 carbon atoms.

Examples of suitable acyl radicals are the formyl, acetyl, propinoyl, butyryl and cyclohexylcarbonyl radicals, and a benzoyl radical which may be substituted, e.g. by a methoxy group; free carboxylic acid and sulphonic acid groups are excluded. The lower radical $R_2$ is preferably an alkyl radical having 1 to 5 carbon atoms.

The preferred substituents on the nucleus A are halogen atoms, in particular chlorine or bromine atoms, methylsulphonyl and nitro groups. The dyes so substituted are preferably mixtures of molecules substituted in the 5 and 6 positions.

The dyes of Formula I are produced by reacting a compound of the formula

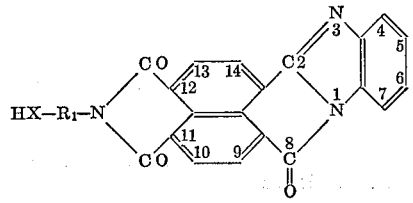

2 with an organic acylating agent free from water-solubilizing groups. The exchange of the hydrogen in a radical of formula —X—H for an acyl radical is effected preferably at temperatures between 100° and 180° C., if preferred in an inert solvent, for example chlorobenzene or nitrobenzene, or in an excess of the acylating agent, and if required in the presence of an acid-binding agent, for example alkali carbonates, alkali acetates or organic bases such as pyridine or dimethylaniline. The preferred acylating agents are acid anhydrides or acid halides, in particular the acid chlorides.

The new dyes are very suitable for use as disperse dyes. For this purpose they are comminuted until the average particle size is approximately 0.01 to 10 microns or more particularly, about 0.1 to 5 microns. Comminution can be carried out in the presence of dispersing agents and fillers. For example, the dried dye can be ground with a dispersing agent and if necessary with a filler, or it can be kneaded in paste form with a dispersing agent and subsequently vacuum or jet dried. The resulting dye preparations, after the addition of a suitable amount of water, can be employed for dyeing, padding or printing from long or short baths.

For dyeing in long baths up to about 10 grams dye per litre are generally used, for padding up to about 150 grams per litre or, preferably, 0.1 to 100 grams per litre; and for printing up to about 150 grams per 1000 grams of print paste. The liquor ratio may vary within wide limits, for example from about 1:3 to 1:200 or preferably from 1:3 to 1:80.

From aqueous dispersion the dyes build up well on hydrophobic synthetic fibres and semi-synthetic fibres. They are particularly suitable for dyeing, padding and printing filaments, loose fibres, yarns, woven fabrics and knitted goods of linear aromatic polyesters. These are generally the polycondensation products of terephthalic acid and glycols, in particular ethylene glycol.

The known dyeing methods are used. Polyester fibres can be exhaustion dyed in the presence of carriers at temperatures of about 80° to 125° C. at the higher temperatures under pressure, or alternatively in the temperature range of about 100° to 140° C. without a carrier. These fibres can be pad dyed or printed with aqueous dispersions of the new dyes and the dyeings or prints fixed at about 140° to 230° C. by means of water vapour or hot air.

Generally a dispersing agent or a mixture of dispersing agents, preferably of anionic or nonionic character, is used. Often about 0.5 gram of dispersing agent per litre of the dyeing medium is sufficent, although greater amounts of up to about 3 grams per litre can be used. Examples of known and particularly suitable anionic dispersing agents are the condensation products of naphthalene-sulphonic acids and formaldehyde, notably the dinaphthylmethanedisulphonates, the esters of sulphonated succinic acid, Turkey red oil, the alkali salts of the sulphuric acid esters of fatty alcohols, e.g. sodium lauryl sulphate and sodium cetyl sulphate, sulphite cellulose waste lye or its alkali salts, soaps, and the alkali metal sulphates of the monoglycerides of fatty acids. Examples of known and very suitable non-ioninc dispersing agents are the adducts of about 3–40 moles ethyleneoxide and alkylphenols fatty alcohols or fatty amines and their neutral sulphuric acid esters.

In padding and printing applications the usual thickening agents are employed, for example modified natural products, such as sodium alignates, British gum, gum arabic, crystal gum, locust bean gum, gum tragacanth, carboxymethyl cellulose, hydorxyethyl - cellulose and starches, or synthetic products such as polyacrylamides or polyvinyl alcohols.

The dyeings obtained have excellent all-around fastness, the fastness to light, water washing, pleating and thermofixation being especially noteworthy. Wool is well reserved.

The dyes are stable to mild reducing agents and under hydrolysing conditions are virtually unaffected even at 130° C. They are superior to the dyes disclosed in German Pat. 1,049,821 in that they exhibit greater stability of shade in hot wash baths and in dry heat treatments.

In the examples the parts and percentages are by weight and the temperatures in degrees centigrade.

EXAMPLE 1

Six parts of the condensation product of naphthoylene-benzimidazole-11,12-dicarboxylic anhydride and mono-iso-propanolamine are entered into 35 parts of propionic anhydride. The reaction mixture is maintained at 140° for 3 hours with constant stirring and subsequently allowed to cool to room temperature. The reaction product is filtered off, washed with ethanol and expressed well. It is then stirred into 50 parts of water to form a suspension which is adjusted to pH 8–9 with 20% sodium hydroxide solution, then boiled for a short time and filtered while still hot. The product is washed with water until of neutral reaction and dried in a drying cabinet at 100–110°. A loose crystalline powder of pale golden yellow colour is obtained. On polyester fibres it gives dyeings of yellow shade having excellent all-around fastness.

EXAMPLE 2

Six parts of a mixture of the condensation products of naphthoylenebenzimidazole-11 12-dicarboxylic anhydride and a 9:11 mixture of monoethanolamine and mono-iso-propanolamine are entered into 40 parts of acetic anhydride and the mixture is held at 135° for 4 hours with constant stirring. On cooling to room temperature, the product is filtered off, washed with 5 parts of glacial acetic acid and then with 20 parts of 50% acetic acid, and well expressed. It is then stirred into 100 parts of water the resulting suspension is adjusted to pH 8–9 with sodium hydroxide solution and boiled for a short time. The product is again filtered off, washed with water until of neutral reaction and dried at 100–110°. The yield is 6.3 parts of a loose crystalline powder of golden yellow colour.

Thin layer chromatography shows that the product consists of two very similar components, one of which is identical with the dye of the tabulated Example 4 and the other with the dye of Example 10 in the same table.

EXAMPLE 3

Four parts of the condensation product of naphthoylenebenzimidiazole - 11,12 - dicarboxylic anhydride and mono-iso-propanolamine are added to a mixture of 10 parts of acetic anhydride and 15 parts of propionic anhydried. The mixture is raised to 140° and stirred for 3 hours at this temperature, after which it is allowed to cool to room temperature. The product is filtered off, washed with ethanol, expressed well and stirred into 50 parts of water. The pH of this suspension is adjusted to 8–9 with sodium hydroxide solution and, after boiling for a while, the product is filtered free, washed with water until of neutral reaction and dried at 100–110° C. A loose, bright yellow powder is obtained which gives yellow dyeings of excellent fastness on polyester fibres.

Further dyes conforming to the present invention bear the groups listed in the following table.

TABLE I

| Example | A | $R_1$ | X | Acyl | Shade on polyester |
|---|---|---|---|---|---|
| 4 |  | —(CH$_2$)$_2$— | —O— | —COCH$_3$ | Yellow. |
| 5 | Same as above | —(CH$_2$)$_2$— | —O— | —COCH$_2$CH$_3$ | Reddish yellow. |
| 6 | do | —(CH$_2$)$_3$— | —O— | —COCH$_3$ | Yellow. |
| 7 | do | —(CH$_2$)$_2$— | —O— | —COCH$_2$CH$_2$CH$_3$ | Golden yellow. |
| 8 | do | —(CH$_2$)$_2$— | —N—<br>(CH$_2$)OCOCH$_3$ | —COCH$_3$ | Neutral yellow. |
| 9 | do | —(CH$_2$)$_3$— | —N—<br>(CH$_2$)OCOCH$_3$ | —COCH$_3$ | Do. |
| 10 | do | —CH$_2$CH—<br>$\quad\;$ CH$_3$ | —O— | —COCH$_3$ | Yellow. |
| 11 | do | —CH$_2$CH—<br>$\quad\;$ CH$_3$ | —O— | —CHO | Reddish yellow. |
| 12 | do | —CH—CH$_2$—<br>CH$_3$ | —O— | —COCH$_3$ | Yellow. |
| 13 | do | —CH—CH$_2$—<br>CH$_2$CH$_3$ | —O— | —COCH$_3$ | Neutral yellow. |
| 14 | do | —CH—CH$_2$—<br>CH$_2$CH$_3$ | —O— | —COC$_2$H$_5$— | Do. |
| 15 | do | —CH$_2$CH$_2$—O—CH$_2$CH$_2$— | —O— | —COCH$_3$ | Golden yellow. |
| 16 | do | —CH$_2$CH$_2$—O—CH$_2$CH$_2$— | —O— | —COC$_2$H$_5$ | Do. |
| 17 | do | 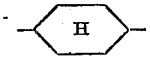 | —O— | —COC$_2$H$_5$ | Reddish yellow. |
| 18 | do | —CH$_2$—CH—<br>$\qquad\;$ CH$_3$ | —O— |  | Yellow. |
| 19 | do | —(CH$_2$)$_2$— | —O— | 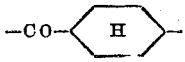 | Do. |

TABLE I—Continued

| Example | A | $R_1$ | X | Acyl | Shade on polyester |
|---|---|---|---|---|---|
| 20 | ⬡—Cl | —CH₂CH₂— | —O— | —COCH₃ | Golden yellow. |
| 21 | ⬡—Br | —CH₂CH₂— | —O— | —COC₂H₅ | Do. |
| 22 | Same as above | —CH₂—CH(CH₃)— | —O— | —COCH₃ | Do. |
| 23 | ⬡—SO₂CH₃ | —CH₂—CH₂— | —O— | —COCH₃— | Greenish yellow. |
| 24 | Same as above | —CH₂—CH(CH₃)— | —O— | —COC₂H₅ | Do. |
| 25 | ⬡—NO₂ | —CH₂CH₂— | —O— | —COCH₃ | Do. |
| 26 | Same as above | —CH₂CH(CH₃)— | —O— | —COCH₃ | Do. |
| 27 | do | —CH₂—CH(CH₃)— | —O— | —COC₂H₅ | Do. |
| 28 | do | —(CH₂)₃— | —O— | —COC₂H₅ | Do. |

The following table details further mixtures of dyes conforming to the present convention.

TABLE II

| Example | A | $R_1$ | X | Acyl | Shade on polyester |
|---|---|---|---|---|---|
| 29 | ⬡ | —CH₂CH₂— | —O— | {—(COCH₃)]½ / —(COC₂H₅)½} | Yellow. |
| 30 | Same as above | {(—CH₂—CH₂—)½ / (—CH₂—CH(CH₃)—)½} | —O— | —COC₂H₅ | Neutral yellow. |
| 31 | do | —CH₂—CH(CH₃)— | —O— | {—(COC₂H₅)½ / —(COC₃H₇)½} | Yellow. |
| 32 | do | —(CH₂)₃— | {[—O—]½ / (—N(CH₂CH₂OCOCH₃)—)½} | —COCH₃ | Golden yellow. |
| 33 | ⬡—Cl | {(—CH₂CH₂—)½ / (CH₂—CH(CH₃)—)½} | —O— | —COCH₃ | Do. |
| 34 | Same as above | Same as above | —O— | —COC₂H₅ | Do. |
| 35 | ⬡—NO₂ | —CH₂—CH(CH₃)— | —O— | {—(COCH₃)½ / —(COC₂H₅)½} | Greenish yellow. |
| 36 | ⬡—SO₂CH₃ | —CH₂—CH(CH₃)— | —O— | Same as above | Do. |

TABLE II—Continued

| Example | A | R₁ | X | Acyl | Shade on polyester |
|---|---|---|---|---|---|
| 37 | 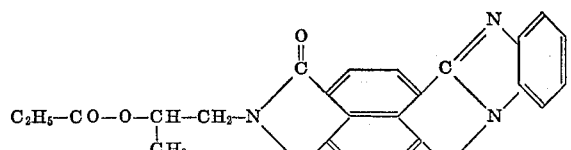 | —(CH₂)₃— | —N—<br>\|<br>CH₃ | Same as above | Yellow. |
| 38 | 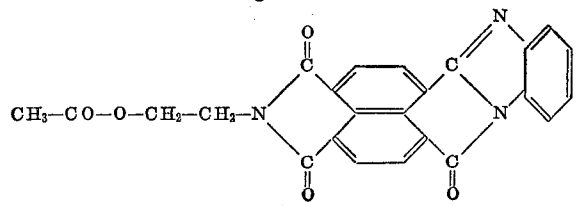 | {—(CH₂CH₂)—½<br>—(CH₂CH)—½<br>\|<br>CH₃} | —O— | —COCH₃ | Greenish yellow. |
| 39 | Same as above | Same as above | —O— | —COC₂H₅ | Do. |

DYEING EXAMPLE 1

A fine aqueous dispersion is prepared with 30 parts of the dye of Example 6, 70 parts of sodium dinaphthylmethane disulphonate and 3 parts of sodium alginate. It is made up to 100 parts with water and well mixed to form a padding liquor which is applied to a polyester fabric at 20°. The padded fabric is air dried at 60–100° and fixed by exposure for 60 seconds in dry air at 230°. It is then rinsed, soaped, rinsed again and dried. A brilliant yellow dyeing with outstanding fastness properties is obtained.

DYEING EXAMPLE 2

A dyeing preparation is formed as described in the preceding example, using the dye of Example 8 in the table. 8 parts of this preparation are added to a dyebath of 4000 parts of water containing 2 parts of sodium lauryl sulphate in a high-temperature dyeing machine. 100 parts of a scoured fabric of polyester fibre are entered into the bath and dyed in the closed autoclave for 1 hour at 130–140° C. After dyeing the fabric is rinsed, soaped, rinsed and dried. A deep yellow dyeing is obtained which has excellent fastness properties.

DYEING EXAMPLE 3

A mixture of 7 parts of the dye mixture obtained by the procedure of Example 2, 4 parts of sodium dinaphthylmethane disulphonate, 4 parts of sodium cetyl sulphate and 5 parts of anhydrous sodium sulphate is ground in a ball mill for 24 hours and subsequently passed through a sieve of 135 meshes/cm.² fineness. 0.325 part of this dye preparation are added to a dyebath of 4000 parts of water containing 2 parts of sodium lauryl sulphate. 100 parts of a scoured fabric of polyester fibre are entered into the bath at 40–50°, after which 20 parts of an aqueous 10% dispersion of ortho-phenylphenol are added. The bath is raised slowly to 100° and the fabric dyed for 1–2 hours at 95–100°. On removal it is rinsed, soaped, rinsed again and dried. A brilliant dyeing of neutral yellow shade is obtained which has excellent fastness properties.

Formulae of representative dyestuffs of the foregoing examples are as follows:

EXAMPLE 1

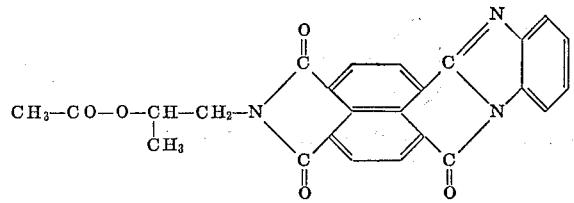

EXAMPLE 2

The mixture consisting of

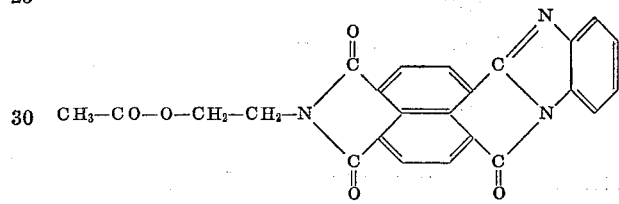

and

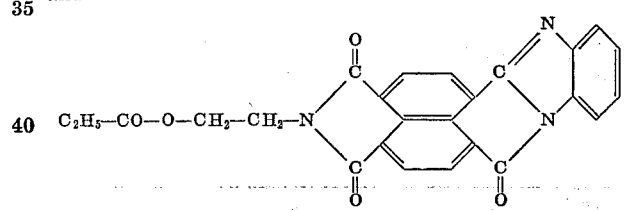

EXAMPLE 29

The mixture consisting of

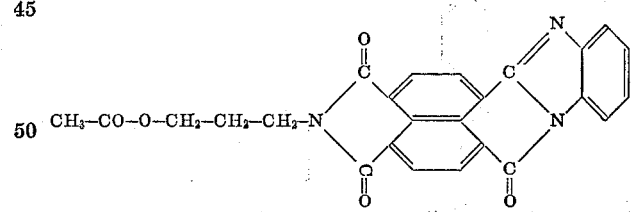

and

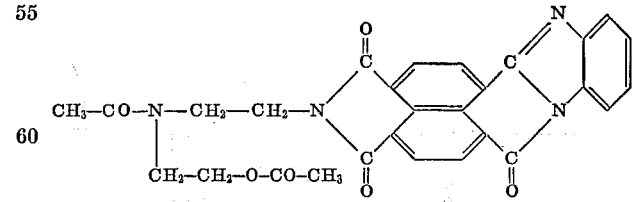

EXAMPLE 6

EXAMPLE 8

Having thus disclosed the invention what we claim is:
1. Disperse naphthoylene-benzimidazole-peri-dicarboximide dye free from water-solubilizing groups and of the formula

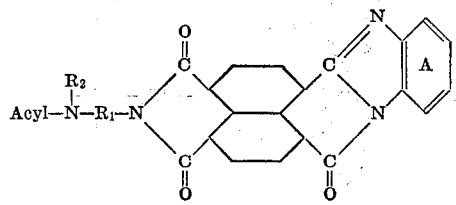

wherein:

$R_1$ has at most 8 carbon atoms and is selected from the group consisting of alkylene, cyclohexylene and alkylene-oxy-alkyl;

$R_2$ is a member selected from the group consisting of lower alkyl and acetoxy(lower)alkyl;

Acyl is a member selected from the group consisting of formyl, acetyl, propionyl, butyryl, cyclohexylcarbonyl, benzoyl and methoxybenzoyl; and nucleus A is either mono-substituted or unsubstituted, any substituent thereon being selected from the group consisting of chloro, bromo, nitro and methylsulfonyl.

2. Dye of the formula

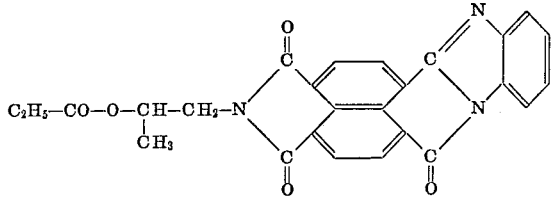

3. A mixture of dyes of the formulae

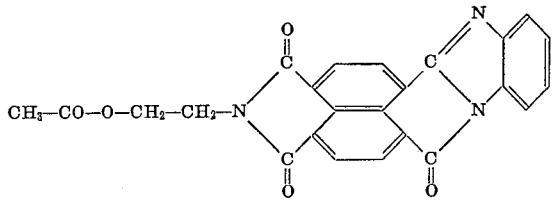

and

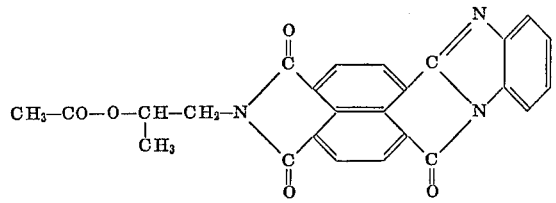

4. A mixture of dyestuffs of the formulae

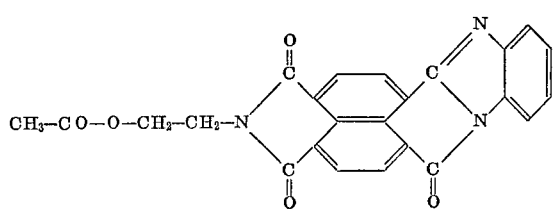

and

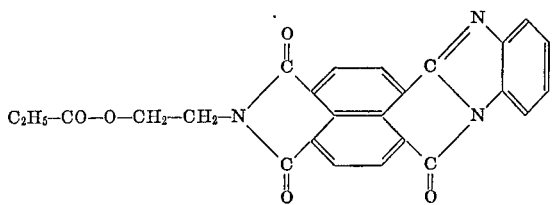

5. Dye of the formula

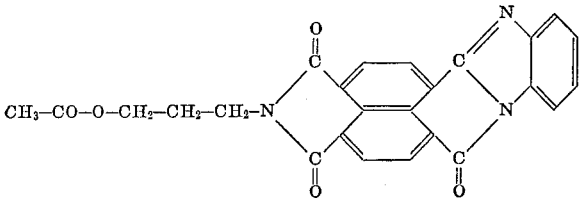

6. Dye according to claim 1 of the formal

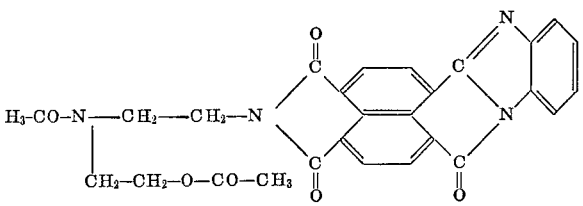

References Cited

UNITED STATES PATENTS

| | | | |
|---|---|---|---|
| 1,935,945 | 11/1933 | Echert et al. | 260—282 |
| 2,965,644 | 12/1960 | Echert et al. | 260—282 |
| 3,362,958 | 1/1968 | Schellhammer | 260—281 |
| 3,428,637 | 2/1969 | Pfister | 260—282 X |

FOREIGN PATENTS

| | | | |
|---|---|---|---|
| 1,281,609 | 10/1968 | Germany | 260—282 |

DONALD G. DAUS, Primary Examiner

U.S. Cl. X.R.

8—55; 260—281